United States Patent
Brytik et al.

(10) Patent No.: US 10,317,546 B2
(45) Date of Patent: Jun. 11, 2019

(54) EFFICIENT AND STABLE ABSORBING BOUNDARY CONDITION IN FINITE-DIFFERENCE CALCULATIONS

(71) Applicants: Valeriy Brytik, Houston, TX (US); Jason Shaw, Sugar Land, TX (US); Charlie Jing, Spring, TX (US); Hong Zhao, Houston, TX (US); John E. Anderson, Conroe, TX (US)

(72) Inventors: Valeriy Brytik, Houston, TX (US); Jason Shaw, Sugar Land, TX (US); Charlie Jing, Spring, TX (US); Hong Zhao, Houston, TX (US); John E. Anderson, Conroe, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 355 days.

(21) Appl. No.: 14/968,961

(22) Filed: Dec. 15, 2015

(65) Prior Publication Data
US 2016/0238723 A1 Aug. 18, 2016

Related U.S. Application Data

(60) Provisional application No. 62/115,938, filed on Feb. 13, 2015.

(51) Int. Cl.
*G01V 1/28* (2006.01)
*G01V 99/00* (2009.01)
*G06F 17/10* (2006.01)

(52) U.S. Cl.
CPC ............ *G01V 1/282* (2013.01); *G01V 99/005* (2013.01); *G06F 17/10* (2013.01)

(58) Field of Classification Search
CPC ....... G01V 1/282; G01V 99/005; G06F 17/10
(Continued)

(56) References Cited

U.S. PATENT DOCUMENTS

| 3,812,457 A | 5/1974 | Weller |
| 3,864,667 A | 2/1975 | Bahjat |

(Continued)

FOREIGN PATENT DOCUMENTS

| CA | 2 796 631 | 11/2011 |
| EP | 1 094 338 | 4/2001 |

(Continued)

OTHER PUBLICATIONS

U.S. Appl. No. 14/329,431, filed Jul. 11, 2014, Krohn et al.
(Continued)

*Primary Examiner* — Saif A Alhija
(74) *Attorney, Agent, or Firm* — ExxonMobil Upstream Research Company—Law Department

(57) ABSTRACT

Method for generating an effective, efficient, and stable absorbing boundary condition in finite-difference calculations, such as model-simulation of predicted seismic data. The top surface and optionally the bottom surface of the computational domain or grid are treated with one or more layers of PML (51), preferably 1D PML, assuming an orthorhombic medium in the PML implementation (52). The side surfaces are handled with one or more ABC layers (53). Further advantages may be realized by tapering earth model symmetry axis on the top and bottom of the model toward the vertical (54). The invention provides a beneficial compromise between reducing artifacts in the image or physical property model and computational efficiency and stability.

9 Claims, 3 Drawing Sheets

(58) Field of Classification Search
USPC .......................................................... 703/2
See application file for complete search history.

(56) References Cited

U.S. PATENT DOCUMENTS

| | | | |
|---|---|---|---|
| 4,159,463 A | 6/1979 | Silverman | |
| 4,168,485 A | 9/1979 | Payton et al. | |
| 4,545,039 A | 10/1985 | Savit | |
| 4,562,650 A | 1/1986 | Nagasawa et al. | |
| 4,575,830 A | 3/1986 | Ingram et al. | |
| 4,594,662 A | 6/1986 | Devaney | |
| 4,636,957 A | 1/1987 | Vannier et al. | |
| 4,675,851 A | 6/1987 | Savit et al. | |
| 4,686,654 A | 8/1987 | Savit | |
| 4,707,812 A | 11/1987 | Martinez | |
| 4,715,020 A | 12/1987 | Landrum, Jr. | |
| 4,766,574 A | 8/1988 | Whitmore et al. | |
| 4,780,856 A | 10/1988 | Becquey | |
| 4,823,326 A | 4/1989 | Ward | |
| 4,924,390 A | 5/1990 | Parsons et al. | |
| 4,953,657 A | 9/1990 | Edington | |
| 4,969,129 A | 11/1990 | Currie | |
| 4,982,374 A | 1/1991 | Edington et al. | |
| 5,260,911 A | 11/1993 | Mason et al. | |
| 5,469,062 A | 11/1995 | Meyer, Jr. | |
| 5,583,825 A | 12/1996 | Carrazzone et al. | |
| 5,677,893 A | 10/1997 | de Hoop et al. | |
| 5,715,213 A | 2/1998 | Allen | |
| 5,717,655 A | 2/1998 | Beasley | |
| 5,719,821 A | 2/1998 | Sallas et al. | |
| 5,721,710 A | 2/1998 | Sallas et al. | |
| 5,790,473 A | 8/1998 | Allen | |
| 5,798,982 A | 8/1998 | He et al. | |
| 5,822,269 A | 10/1998 | Allen | |
| 5,838,634 A | 11/1998 | Jones et al. | |
| 5,852,588 A | 12/1998 | de Hoop et al. | |
| 5,878,372 A | 3/1999 | Tabarovsky et al. | |
| 5,920,838 A | 7/1999 | Norris et al. | |
| 5,924,049 A | 7/1999 | Beasley et al. | |
| 5,999,488 A | 12/1999 | Smith | |
| 5,999,489 A | 12/1999 | Lazaratos | |
| 6,014,342 A | 1/2000 | Lazaratos | |
| 6,021,094 A | 2/2000 | Ober et al. | |
| 6,028,818 A | 2/2000 | Jeffryes | |
| 6,058,073 A | 5/2000 | VerWest | |
| 6,125,330 A | 9/2000 | Robertson et al. | |
| 6,219,621 B1 | 4/2001 | Hornbostel | |
| 6,225,803 B1 | 5/2001 | Chen | |
| 6,311,133 B1 | 10/2001 | Lailly et al. | |
| 6,317,695 B1 | 11/2001 | Zhou et al. | |
| 6,327,537 B1 | 12/2001 | Ikelle | |
| 6,374,201 B1 | 4/2002 | Grizon et al. | |
| 6,381,543 B1 | 4/2002 | Guerillot et al. | |
| 6,388,947 B1 | 5/2002 | Washbourne et al. | |
| 6,480,790 B1 | 11/2002 | Calvert et al. | |
| 6,522,973 B1 | 2/2003 | Tonellot et al. | |
| 6,545,944 B2 | 4/2003 | de Kok | |
| 6,549,854 B1 | 4/2003 | Malinvemo et al. | |
| 6,574,564 B2 | 6/2003 | Lailly et al. | |
| 6,593,746 B2 | 7/2003 | Stolarczyk | |
| 6,662,147 B1 | 12/2003 | Fournier et al. | |
| 6,665,615 B2 | 12/2003 | Van Riel et al. | |
| 6,687,619 B2 | 2/2004 | Moerig et al. | |
| 6,687,659 B1 | 2/2004 | Shen | |
| 6,704,245 B2 | 3/2004 | Becquey | |
| 6,714,867 B2 | 3/2004 | Meunier | |
| 6,735,527 B1 | 5/2004 | Levin | |
| 6,754,590 B1 | 6/2004 | Moldoveanu | |
| 6,766,256 B2 | 7/2004 | Jeffryes | |
| 6,826,486 B1 | 11/2004 | Malinverno | |
| 6,836,448 B2 | 12/2004 | Robertsson et al. | |
| 6,842,701 B2 | 1/2005 | Moerig et al. | |
| 6,859,734 B2 | 2/2005 | Bednar | |
| 6,865,487 B2 | 3/2005 | Charron | |
| 6,865,488 B2 | 3/2005 | Moerig et al. | |
| 6,876,928 B2 | 4/2005 | Van Riel et al. | |
| 6,882,938 B2 | 4/2005 | Vaage et al. | |
| 6,882,958 B2 | 4/2005 | Schmidt et al. | |
| 6,901,333 B2 | 5/2005 | Van Riel et al. | |
| 6,903,999 B2 | 6/2005 | Curtis et al. | |
| 6,905,916 B2 | 6/2005 | Bartsch et al. | |
| 6,906,981 B2 | 6/2005 | Vauge | |
| 6,927,698 B2 | 8/2005 | Stolarczyk | |
| 6,944,546 B2 | 9/2005 | Xiao et al. | |
| 6,947,843 B2 | 9/2005 | Fisher et al. | |
| 6,970,397 B2 | 11/2005 | Castagna et al. | |
| 6,977,866 B2 | 12/2005 | Huffman et al. | |
| 6,999,880 B2 | 2/2006 | Lee | |
| 7,046,581 B2 | 5/2006 | Calvert | |
| 7,050,356 B2 | 5/2006 | Jeffryes | |
| 7,069,149 B2 | 6/2006 | Goff et al. | |
| 7,027,927 B2 | 7/2006 | Routh et al. | |
| 7,072,767 B2 | 7/2006 | Routh et al. | |
| 7,092,823 B2 | 8/2006 | Lailly et al. | |
| 7,110,900 B2 | 9/2006 | Adler et al. | |
| 7,184,367 B2 | 2/2007 | Yin | |
| 7,230,879 B2 | 6/2007 | Herkenoff et al. | |
| 7,271,747 B2 | 9/2007 | Baraniuk et al. | |
| 7,330,799 B2 | 2/2008 | Lefebvre et al. | |
| 7,337,069 B2 | 2/2008 | Masson et al. | |
| 7,373,251 B2 | 5/2008 | Hamman et al. | |
| 7,373,252 B2 | 5/2008 | Sherrill et al. | |
| 7,376,046 B2 | 5/2008 | Jeffryes | |
| 7,376,539 B2 | 5/2008 | Lecomte | |
| 7,400,978 B2 | 7/2008 | Langlais et al. | |
| 7,436,734 B2 | 10/2008 | Krohn | |
| 7,480,206 B2 | 1/2009 | Hill | |
| 7,584,056 B2 | 9/2009 | Koren | |
| 7,599,798 B2 | 10/2009 | Beasley et al. | |
| 7,602,670 B2 | 10/2009 | Jeffryes | |
| 7,616,523 B1 | 11/2009 | Tabti et al. | |
| 7,620,534 B2 | 11/2009 | Pita et al. | |
| 7,620,536 B2 | 11/2009 | Chow | |
| 7,646,924 B2 | 1/2010 | Donoho | |
| 7,672,194 B2 | 3/2010 | Jeffryes | |
| 7,672,824 B2 | 3/2010 | Dutta et al. | |
| 7,675,815 B2 | 3/2010 | Saenger et al. | |
| 7,679,990 B2 | 3/2010 | Herkenhoff et al. | |
| 7,684,281 B2 | 3/2010 | Vaage et al. | |
| 7,710,821 B2 | 5/2010 | Robertsson et al. | |
| 7,715,985 B2 | 5/2010 | Van Manen et al. | |
| 7,715,986 B2 | 5/2010 | Nemeth et al. | |
| 7,725,266 B2 | 5/2010 | Sirgue et al. | |
| 7,791,980 B2 | 9/2010 | Robertsson et al. | |
| 7,835,072 B2 | 11/2010 | Izumi | |
| 7,840,625 B2 | 11/2010 | Candes et al. | |
| 7,940,601 B2 | 5/2011 | Ghosh | |
| 8,121,823 B2 | 2/2012 | Krebs et al. | |
| 8,248,886 B2 | 8/2012 | Neelamani et al. | |
| 8,428,925 B2 | 4/2013 | Krebs et al. | |
| 8,437,998 B2 | 5/2013 | Routh et al. | |
| 8,547,794 B2 | 10/2013 | Gulati et al. | |
| 8,688,381 B2 | 4/2014 | Routh et al. | |
| 8,781,748 B2 | 7/2014 | Laddoch et al. | |
| 2002/0099504 A1 | 7/2002 | Cross et al. | |
| 2002/0120429 A1 | 8/2002 | Ortoleva | |
| 2002/0183980 A1 | 12/2002 | Guillaume | |
| 2004/0199330 A1 | 10/2004 | Routh et al. | |
| 2004/0225438 A1 | 11/2004 | Okoniewski et al. | |
| 2006/0235666 A1 | 10/2006 | Assa et al. | |
| 2007/0036030 A1 | 2/2007 | Baumel et al. | |
| 2007/0038691 A1 | 2/2007 | Candes et al. | |
| 2007/0274155 A1 | 11/2007 | Ikelle | |
| 2008/0175101 A1 | 7/2008 | Saenger et al. | |
| 2008/0306692 A1 | 12/2008 | Singer et al. | |
| 2009/0006054 A1 | 1/2009 | Song | |
| 2009/0067041 A1 | 3/2009 | Krauklis et al. | |
| 2009/0070042 A1 | 3/2009 | Birchwood et al. | |
| 2009/0083006 A1 | 3/2009 | Mackie | |
| 2009/0164186 A1 | 6/2009 | Haase et al. | |
| 2009/0164756 A1 | 6/2009 | Dokken et al. | |
| 2009/0187391 A1 | 7/2009 | Wendt et al. | |
| 2009/0248308 A1 | 10/2009 | Luling | |
| 2009/0254320 A1 | 10/2009 | Lovatini et al. | |

(56) References Cited

U.S. PATENT DOCUMENTS

| | | |
|---|---|---|
| 2009/0259406 A1 | 10/2009 | Khadhraoui et al. |
| 2010/0008184 A1 | 1/2010 | Hegna et al. |
| 2010/0018718 A1 | 1/2010 | Krebs et al. |
| 2010/0039894 A1 | 2/2010 | Abma et al. |
| 2010/0054082 A1 | 3/2010 | McGarry et al. |
| 2010/0088035 A1 | 4/2010 | Etgen et al. |
| 2010/0103772 A1 | 4/2010 | Eick et al. |
| 2010/0118651 A1 | 5/2010 | Liu et al. |
| 2010/0142316 A1 | 6/2010 | Keers et al. |
| 2010/0161233 A1 | 6/2010 | Saenger et al. |
| 2010/0161234 A1 | 6/2010 | Saenger et al. |
| 2010/0185422 A1 | 7/2010 | Hoversten |
| 2010/0208554 A1 | 8/2010 | Chiu et al. |
| 2010/0212902 A1 | 8/2010 | Baumstein et al. |
| 2010/0246324 A1 | 9/2010 | Dragoset, Jr. et al. |
| 2010/0265797 A1 | 10/2010 | Robertsson et al. |
| 2010/0270026 A1 | 10/2010 | Lazaratos et al. |
| 2010/0286919 A1 | 11/2010 | Lee et al. |
| 2010/0299070 A1 | 11/2010 | Abma |
| 2011/0000678 A1 | 1/2011 | Krebs et al. |
| 2011/0040926 A1 | 2/2011 | Donderici et al. |
| 2011/0051553 A1 | 3/2011 | Scott et al. |
| 2011/0090760 A1 | 4/2011 | Rickett et al. |
| 2011/0131020 A1 | 6/2011 | Meng |
| 2011/0134722 A1 | 6/2011 | Virgilio et al. |
| 2011/0182141 A1 | 7/2011 | Zhamikov et al. |
| 2011/0182144 A1 | 7/2011 | Gray |
| 2011/0191032 A1 | 8/2011 | Moore |
| 2011/0194379 A1 | 8/2011 | Lee et al. |
| 2011/0222370 A1 | 9/2011 | Downton et al. |
| 2011/0227577 A1 | 9/2011 | Zhang et al. |
| 2011/0235464 A1 | 9/2011 | Brittan et al. |
| 2011/0238390 A1 | 9/2011 | Krebs et al. |
| 2011/0246140 A1 | 10/2011 | Abubakar et al. |
| 2011/0267921 A1 | 11/2011 | Mortel et al. |
| 2011/0267923 A1 | 11/2011 | Shin |
| 2011/0276320 A1 | 11/2011 | Krebs et al. |
| 2011/0288831 A1 | 11/2011 | Tan et al. |
| 2011/0299361 A1 | 12/2011 | Shin |
| 2011/0320180 A1 | 12/2011 | Al-Saleh |
| 2012/0010862 A1 | 1/2012 | Costen |
| 2012/0014215 A1 | 1/2012 | Saenger et al. |
| 2012/0014216 A1 | 1/2012 | Saenger et al. |
| 2012/0051176 A1 | 3/2012 | Liu |
| 2012/0073824 A1 | 3/2012 | Routh |
| 2012/0073825 A1 | 3/2012 | Routh |
| 2012/0082344 A1 | 4/2012 | Donoho |
| 2012/0143506 A1 | 6/2012 | Routh et al. |
| 2012/0215506 A1 | 8/2012 | Rickett et al. |
| 2012/0218859 A1 | 8/2012 | Soubaras |
| 2012/0275264 A1 | 11/2012 | Kostov et al. |
| 2012/0275267 A1 | 11/2012 | Neelamani et al. |
| 2012/0290214 A1 | 11/2012 | Huo et al. |
| 2012/0314538 A1 | 12/2012 | Washbourne et al. |
| 2012/0316790 A1 | 12/2012 | Washbourne et al. |
| 2012/0316844 A1 | 12/2012 | Shah et al. |
| 2013/0060539 A1 | 3/2013 | Baumstein |
| 2013/0081752 A1 | 4/2013 | Kurimura et al. |
| 2013/0238246 A1 | 9/2013 | Krebs et al. |
| 2013/0279290 A1 | 10/2013 | Poole |
| 2013/0282292 A1 | 10/2013 | Wang et al. |
| 2013/0311149 A1 | 11/2013 | Tang |
| 2013/0311151 A1 | 11/2013 | Plessix |
| 2014/0350861 A1 | 11/2014 | Wang et al. |
| 2014/0358504 A1 | 12/2014 | Baumstein et al. |
| 2014/0372043 A1 | 12/2014 | Hu et al. |

FOREIGN PATENT DOCUMENTS

| | | |
|---|---|---|
| EP | 1 746 443 | 1/2007 |
| GB | 2 390 712 | 1/2004 |
| GB | 2 391 665 | 2/2004 |
| WO | WO 2006/037815 | 4/2006 |
| WO | WO 2007/046711 | 4/2007 |
| WO | WO 2008/042081 | 4/2008 |
| WO | WO 2008/123920 | 10/2008 |
| WO | WO 2009/067041 | 5/2009 |
| WO | WO 2009/117174 | 9/2009 |
| WO | WO 2010/085822 | 7/2010 |
| WO | WO 2011/040926 | 4/2011 |
| WO | WO 2011/091216 | 7/2011 |
| WO | WO 2011/093945 | 8/2011 |
| WO | WO 2012/024025 | 2/2012 |
| WO | WO 2012/041834 | 4/2012 |
| WO | WO 2012/083234 | 6/2012 |
| WO | WO 2012/134621 | 10/2012 |
| WO | WO 2012/170201 | 12/2012 |
| WO | WO 2013/081752 | 6/2013 |

OTHER PUBLICATIONS

U.S. Appl. No. 14/330,767, filed Jul. 14, 2014, Tang et al.

Bechache, E. et al., "Stability of Perfectly Matched Layers, Group Velocities and Anisotropic Waves," Research Report, RR-4304, ISSN 0249-6399, 40 pgs. (May 2006).

Berenger, J-P., "A Perfectly Matched Layer for the Asorption of Electromagnetic Waves," *J. of Computational Physics* 114, pp. 185-200 (1994).

Dmitriev, M.N. et al., "Application of M-PML Reflectionless Boundary Conditions to the Numerical Simulation of Wave Propagation in Anisotropic Media, Part I: Reflectivity," *Numerical Analysis and Applications* 1(4), pp. 271-280 (2011).

Duru, K. et al., "Well-Posed and Discretely Stable Perfectly Matched Layers for Elastic Wave Equations in Second Order Formulation," *Commun. Comput. Phys.* 11(5), pp. 1643-1672 (2012).

Komatitsch, D. et al., "An Unsplit Convultional Perfectly Matched Layer Improved at Grazing Incidence for the Seismic Wave Equation," *Geophysics* 72(5), pp. SM155-SM166 (Sep.-Oct. 2007).

Kosloff, R. et al., "Absorbing Boundaries for Wave Propagation Problems," *J. of Computational Physics* 63, pp. 363-376 (1986).

Loh, P-R., "Fundamental Relation between Phase and Group Velocity, and Application to the Failure of Perfectly Matched Layers in Backward-Wve Structures," *Physical Review* E79, 4 pgs. (2009).

Marcinkovich, C. et al., "On the Implementation of Perfectly Matched Layers in a Three-Dimensional Fourth-Order Velocity-Stress Finite Difference Scheme," *J. of Geophysical Research* 108(B5), pp. ESE18-1-ESE18-16 (2003).

Oskooi, A. et al., "Distinguishing Correct from Incorrect PML Proposals and a Corrected Unplit PML for Anisotropic, Dispersive Media," *J. of Computational Physics* 230, pp. 2369-2377 (2011).

Zhang, D. et al., "Least-Squares Reverse Time Migration of Multiples," *Geophysics* 79(1), pp. S11-S21 (Jan.-Feb. 2014).

Dong, L., et al., (2005), "An Eigenvalue Decomposition Method to Construct Absorbing Boundary Conditions for Acoustic and Elastic Wave Equations", Nanjing Institute of Geophysical Prospecting and Institute of Physics Publishing, Journal of Geophysics and Engineering, vol. 2, pp. 192-198.

EFFICIENT AND STABLE ABSORBING BOUNDARY CONDITION IN FINITE-DIFFERENCE CALCULATIONS

CROSS-REFERENCE TO RELATED APPLICATION

This application claims the benefit of U.S. Provisional Patent Application 62/115,938 filed Feb. 13, 2015 entitled EFFICIENT AND STABLE ABSORBING BOUNDARY CONDITION IN FINITE-DIFFERENCE CALCULATIONS, the entirety of which is incorporated by reference herein.

FIELD OF THE INVENTION

This disclosure relates generally to the field of geophysical prospecting for hydrocarbons and, more particularly, to seismic data processing and imaging. Specifically, the disclosure relates to the technical fields of seismic simulation, reverse time depth migration, and full waveform inversion.

BACKGROUND

Boundary Conditions

Much of seismic prospecting is based on computer processing seismic data to migrate the data to form a true image of the subsurface or to infer a physical property model of the subsurface through data inversion. Migration and inversion cannot be performed analytically, and therefore must be performed using numerical methods on a computer. The most efficient migration method is reverse time migration (RTM). Both RTM and inversion require model simulation of predicted/measured seismic data, where the model is a model of subsurface velocity or other physical property affecting propagation of seismic waves. In numerical simulation of seismic data (sometimes referred to herein simply as data), large computational domains must be truncated to fit into the computer's memory. Artificial boundaries are introduced by this process. The reflections from an artificial, non-physical boundary may possibly bring artifacts into the image. Correct and suitable implementations of the boundaries are among the major problems of the numerical simulations. There are several different methodologies to deal with the problem, which include: 1) Non-reflecting boundary conditions (which will not be discussed further in this document); 2) Absorbing Boundary Conditions ("ABC"), see for example Kosloff et al. (1986); and 3) perfectly matched layers ("PML") by Berenger (1994).

Absorbing Boundary Conditions and the Perfectly Matched Layers

Absorbing Boundary Conditions were introduced by Kosloff et al. (1986). The term "ABC" as used herein shall be understood to refer to the boundary conditions according to the Kosloff (1986) reference. This is an unconditionally stable method with relatively good absorption properties. The drawback of the method is coherent reflections from the fixed surfaces, like an air/water interface, which could build an artifact in the image. To improve absorption, one might need to increase the number of absorbing layers (referred to as padding), which in turn will negatively affect computational efficiency. Moreover, very low frequency reflections will still be a problem because absorption is a function of the number of wavelengths in the absorbing zone.

The perfectly matched layers ("PML") absorbing boundary condition by Berenger (1994) is another commonly used way to approximate the radiation boundary condition for the sides and bottom of an earth model where the earth model is assumed to have infinite extent but the computational model has finite extent. Up to the discretization error, waves will not reflect from external boundaries of the computational model that are designated to have the radiation boundary condition. In media where the method is stable (see below), PML will give perfect results.

In the standard form of PML as described by Marcinkovich and Olsen (2003), every derivative normal to an exterior boundary has a wave field dissipation operator applied. Several issues arise with standard PML (sometimes referred to as 1D PML) operators. For general anisotropy, if the group velocity and the phase velocity have different signs for the direction normal to the boundary, PML becomes unstable and energy can be amplified rather than attenuated at the boundary (Bechache et al., 2001, and Loh et al., 2009, and Oskooi and Johnson, 2011). Stable and efficient PML implementation is still an active area of research. There are many methods suggested to address the stability issue—multiaxial-PML (M-PML) by Dmitriev et al., 2011, convolutional-PML (CPML) with complex shift by Zhang et al., 2010, and more recent developments—coordinates stretching in the PML region by Duru et. al., 2014. Note that all these methods have high cost and possibly degrade the effectiveness of the absorption. Moreover, the fundamental problem of the stability for these methods is not fully resolved.

In its general meaning, the term absorbing boundary conditions embraces both PML boundary conditions and ABC boundary conditions. To avoid terminology confusion herein, the term ABC will refer only to the Kosloff-type absorbing boundary conditions.

To summarize some drawbacks of existing methods for handling boundary conditions for computational domains used in model simulation of seismic data:
1. ABC—stable, but not effective in absorption.
2. Standard PML—almost perfect absorption, but stability is compromised for some anisotropic materials.
3. M-PML—high cost, and there is compromise between quality and stability; difficult to find optimal damping. Absorption is not very effective.
4. Coordinate stretching in the PML region—high cost, with a compromise between quality and stability; difficult to find optimal damping.
5. Complex shift—see item 2 above; the fundamental problem of stability is not fully resolved.

What is needed is a method that provides a better compromise between absorption, stability, and cost. The present invention satisfies this need.

SUMMARY

The present invention is an unconditionally stable method for minimizing non-physical seismic wave reflections at computational grid boundaries during simulation of seismic waveforms, suitable for programming into automated migration and inversion computations. It is computationally efficient and effective, and applicable to both 2D and 3D, and for typical earth models of interest for RTM and FWI for hydrocarbon prospecting. It is advantageous for both imaging and modeling.

The present inventive method uses ABC boundaries, which are always stable, for the side boundaries of the computational domain. ABC methods do not mitigate low-frequency reflections from the external boundary as effectively as PML methods. This is not a problem on side external boundaries because reflections from side boundaries do not sum coherently for RTM and FWI computations. However, these low-frequency reflections are a problem from top and bottom external boundaries because those reflections do tend to sum coherently and therefore can be misrepresented as geology in RTM and FWI computations.

PML methods can be unstable for boundary zones with high-contrast shear interfaces or for medium anisotropy where group and phase velocities could be oriented in opposite directions relative to the boundary. Stability for PML methods may be ensured in the present invention by choosing only media parameters in the boundary zone with orthorhombic or higher symmetry that have a symmetry axis normal to the external boundary. This choice is realistic for typical geology that exists at the top and bottom boundaries of an earth model for RTM and FWI. If the top or bottom boundary does not match this condition, and a radiation condition boundary condition is desired, a practical solution is to taper the tilt of the symmetry axis over a boundary zone until that tilt is normal to the external boundary and meets the requirement for a stable PML boundary condition.

The present invention's combination of zero-symmetry-axis-tilt-angle PML on top and bottom, with ABC on side boundaries, is very practical, fits common earth models, and is easy to implement.

In one embodiment, the invention is a method for exploring for hydrocarbons in a subsurface region, comprising:
(a) simulating a seismic waveform, using a computer and a model of velocity or other physical property in the subsurface region, wherein computations are performed on a finite computational grid representing a subsurface region, said finite computational grid using absorbing condition boundary conditions to minimize non-physical wave reflections at grid boundaries, said absorbing condition boundary conditions being PML boundary conditions for top surface of the finite computational grid, and ABC boundary conditions for side surfaces of the finite computational grid; and
(b) using the simulated waveform in performing full waveform inversion or reverse time migration of seismic data, and using an updated model of velocity or other physical property from the inversion or a subsurface image from the migration to assess hydrocarbon potential of the subsurface region.

BRIEF DESCRIPTION OF THE DRAWINGS

The advantages of the present invention are better understood by referring to the following detailed description and the attached drawings, in which.

Figure 1:
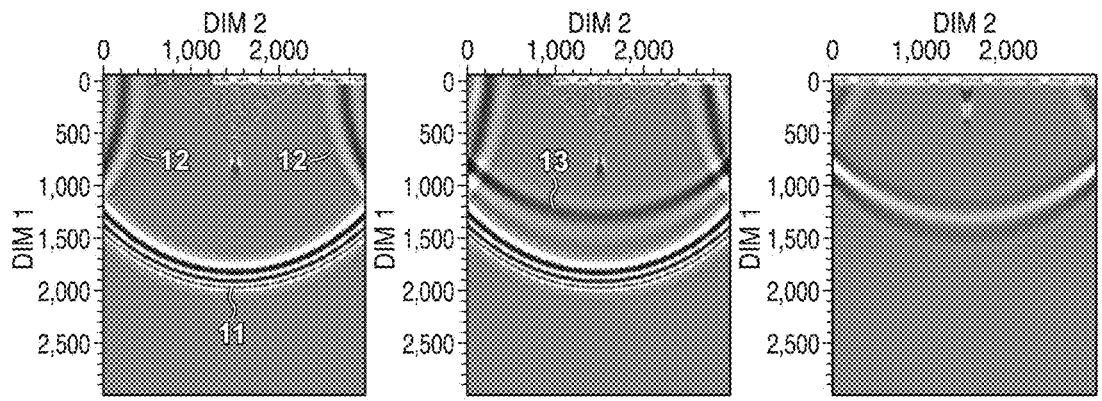
FIG. 1 shows a high saturation image comparison of the present invention's approach to making non-reflecting boundaries (top/bottom PML and sides ABC), shown in the left panel, compared to all ABC (middle), and the difference between the two (right)

The invention will be described in connection with example embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the scope of the invention, as defined by the appended claims.

DETAILED DESCRIPTION

The present inventive method is an unconditionally stable method for introducing boundary conditions that provide effective boundary absorption.

The method begins with some simplifying assumptions that make the invention more robust and efficient. These assumptions are based on insight, gained from experience. Some of the complexities of physical problems can be dropped for all marine surveys and the majority surveys on land with only minor effect on the technical problem being addressed. One such instance of insight is the observation that the top surface boundary very seldom needs to deal with anisotropic earth models with a tilted axis of symmetry. Often the top boundary for marine acquisition is a water/air interface and both of those media are well-represented by isotropic acoustic physics and do not require any consideration of anisotropy in the earth model. Likewise the bottom boundary of the earth model is rarely illuminated by a full range of illumination angles and therefore the earth model zone adjacent to the bottom boundary may not require an accurate understanding of seismic anisotropy as a function of symmetry axis tilt angle for simulations that match recorded seismic data. For both the top and bottom boundary zones of the earth model, physics limited to isotropy, or anisotropy with a vertical symmetry axis for either transverse isotropy or orthotropy, is usually sufficient.

PML boundary conditions are more efficient at emulating radiation condition boundary conditions than ABC boundary conditions. Efficient and stable PML boundary conditions are easily constructed for media with isotropic, transversely isotropic or orthorhombic physics where any anisotropy characterization is restricted to have a vertical axis of symmetry. In contrast, stability and efficiency are much more complicated to achieve for PML implementations for anisotropic media with a tilted axis of symmetry or for general seismic anisotropy. The top boundary condition takes on particular importance because seismic sources are usually placed near the surface of the earth and reflect with large amplitudes from improperly constructed radiation boundary conditions. Reflections from the top and bottom boundaries are particularly important for simulators used in RTM and FWI applications because poorly mitigated reflections from the top and bottom boundaries tend to sum constructively to create artifacts in RTM images or FWI gradients. Reflections from poorly mitigated side boundaries are less of an issue because they tend to not sum constructively into an image to add radiation-boundary-related artifacts that might be misinterpreted as geology.

Thus, the top surface of the simulated domain may be assumed to be an orthorhombic (or Vertically Transversally Isotropic—"VTI") medium, or anisotropic medium, which covers a large portion of the data that are typically acquired. Seismic sources are usually placed near the top surface. Therefore, a boundary condition has a bigger impact there. For the bottom surface there are no reliable tools (except possibly well data) to restrain tilt at great depth. Given this lack of knowledge about what happens at the bottom surface, zero tilt is as good as any other assumption. So, without loss of generality, zero tilt may be assumed at both the top and bottom surfaces of the computational domain. These two findings (i.e., that the probability of encountering general anisotropy at the top or bottom surface may be considered negligible) provide the opportunity to use standard PML without a tilted axis of symmetry for media assuming orthorhombic or higher symmetry (rather than complex PML with its 'tilted' physics assumption) on top and bottom surfaces, and standard PML is both absolutely stable and very effective in reducing reflection.

The side surfaces could have complex media which could lead to stability problems in any PML implementation. It was also recognized that small reflections from the sides are inconsistent (incoherent) from shot to shot, and are mostly directed downwards and are strongly absorbed by the bottom surface PML. These findings suggest use of unconditionally stable Kosloff's ABC on the side surfaces. In the shorthand notation that will be used in places in the remainder of this document, this choice of boundary conditions, i.e. PML for the top and bottom surfaces and ABC for the sides, may be referred to as z—PML and x,y—ABC.

Figure 5:
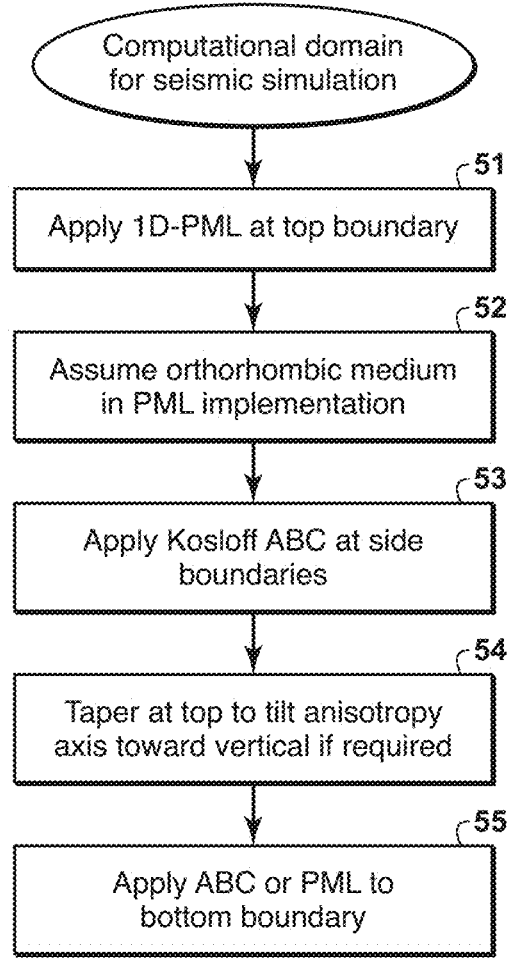
FIG. 5 is a flow chart showing basic steps in one embodiment of the present inventive method.

Such combination (hybrid) of these two techniques gives an efficient and stable absorbing boundary condition in finite-difference calculations. Basic steps for one preferred embodiment of the present inventive method may be summarized as follows, with reference to the flow chart of FIG. 5.

Step 51: Apply one-dimensional (preferably convolutional) PML for top/bottom boundaries.

Step 52: An orthorhombic medium with a vertical axis of symmetry is assumed for the PML implementation in the top/bottom boundary to guarantee computational efficiency, stability, and effectiveness.

Step 53: Use Kosloff's Absorbing Boundary Condition (ABC) on the side/bottom boundaries and corners.

Step 54: Perform tapering to the top/bottom to smooth anisotropy symmetry axis tilt orientation to the vertical if needed. Tapering smoothly rotates the dip (axis of inclination) to zero.

Step 55: Either PML or ABC may be applied to the bottom boundary if desired.

Following next is a detailed mathematical formulation of the invention.

Definition of PML Derivative Operator in One Direction (i.e., 1D PML)

For a single derivative in the z direction using PML, the following definition holds. In the frequency domain, the spatial derivative of the target wave field is computed first and then the result is scaled by the inverse to a gamma function. This operation damps the spatial derivative.

$$\frac{\partial}{\partial \tilde{z}} = \frac{1}{\gamma_z}\frac{\partial}{\partial z}$$

where $$\gamma_z = \frac{i\omega + \mu_z}{i\omega} = 1 + \frac{\mu_z}{i\omega}$$

There is no unique way to choose damping parameter $\mu_z$. One possible choice is to use CPML-style gamma operators following the paper by Komatitsch and Martin (2007). In the time domain, the gamma operator becomes a temporal convolution operator, denoted by $\hat{\gamma}_z$. The inverse to the time-domain gamma convolutional operator will be denoted by $1/\hat{\gamma}_z$. The formulae that follow will imply temporal convolution whenever the time-domain gamma or time-domain inverse gamma operators are shown. These are temporal Fourier transforms of the corresponding functions defined in the frequency domain.

The present inventive method will be demonstrated first on a constant-density isotropic acoustic wave equation case. Next an example VTI pseudo-acoustic case will be given. After that, the orthorhombic and elastic extensions will then be obvious. Solution of the isotropic equation in the interior region of the computational domain may summarized by following equations:

$$\frac{\partial}{\partial t}\begin{pmatrix} p \\ p_{dot} \end{pmatrix} = \begin{pmatrix} 0 & 1 \\ v^2\left(\frac{\partial^2}{\partial x^2} + \frac{\partial^2}{\partial y^2} + \frac{\partial^2}{\partial z^2}\right) & 0 \end{pmatrix}\begin{pmatrix} p \\ p_{dot} \end{pmatrix},$$

where $$p_{dot} = \frac{\partial p}{\partial t}.$$

Equations of system with z—PML are obtained by replacing $$\frac{\partial^2}{\partial z^2}$$

in the equations above by $$\frac{\partial}{\partial \tilde{z}}\frac{\partial}{\partial \tilde{z}}.$$

In the time domain, this relationship is used.

$$\frac{\partial}{\partial \tilde{z}}\frac{\partial}{\partial \tilde{z}} = \frac{1}{\hat{\gamma}_z}\frac{\partial}{\partial z}\frac{1}{\hat{\gamma}_z}\frac{\partial}{\partial z}$$

Then the z—PML constant-density isotropic acoustic equations may be summarized as follows:

$$\frac{\partial}{\partial t}\begin{pmatrix} p \\ p_{dot} \end{pmatrix} = \begin{pmatrix} 0 & 1 \\ v^2\left(\frac{\partial^2}{\partial x^2} + \frac{\partial^2}{\partial y^2} + \frac{1}{\hat{\gamma}_z}\frac{\partial}{\partial z}\frac{1}{\hat{\gamma}_z}\frac{\partial}{\partial z}\right) & 0 \end{pmatrix}\begin{pmatrix} p \\ p_{dot} \end{pmatrix}$$

The variable p represents pressure. The variables x, y, and z are spatial coordinates. The variable v represents the medium velocity.

After slight modification, this is equivalent to the following form:

$$\frac{\partial}{\partial t}\begin{pmatrix} p \\ \hat{\gamma}_z p_{dot} \end{pmatrix} =$$

$$\frac{\partial}{\partial t}\begin{pmatrix} p \\ p_{dot} \end{pmatrix} + \begin{pmatrix} 0 \\ \mu_z p_{dot} \end{pmatrix} = \begin{pmatrix} 0 & 1 \\ v^2\left(\hat{\gamma}_z\left(\frac{\partial^2}{\partial x^2} + \frac{\partial^2}{\partial y^2}\right) + \frac{\partial}{\partial z}\frac{1}{\hat{\gamma}_z}\frac{\partial}{\partial z}\right) & 0 \end{pmatrix}\begin{pmatrix} p \\ p_{dot} \end{pmatrix}$$

This reduces to the next system of equations that enable more a more computationally efficient implementation.

$$\frac{\partial}{\partial t}\begin{pmatrix} p \\ p_{dot} \end{pmatrix} = \begin{pmatrix} 0 & 1 \\ v^2\left(\hat{\gamma}_z\left(\frac{\partial^2}{\partial x^2} + \frac{\partial^2}{\partial y^2}\right) + \frac{\partial}{\partial z}\frac{1}{\hat{\gamma}_z}\frac{\partial}{\partial z}\right) & -\mu_z \end{pmatrix}\begin{pmatrix} p \\ p_{dot} \end{pmatrix}$$

Kosloff's ABC boundary conditions in (x, y, z) coordinates may be written in the following compact form:

$$\frac{\partial}{\partial t}\begin{pmatrix} p \\ p_{dot} \end{pmatrix} = \begin{pmatrix} -\mu_{xyz} & 1 \\ v^2\left(\frac{\partial^2}{\partial x^2} + \frac{\partial^2}{\partial y^2} + \frac{\partial^2}{\partial z}\right) & -\mu_{xyz} \end{pmatrix}\begin{pmatrix} p \\ p_{dot} \end{pmatrix}$$

ABC boundary conditions which absorb only in the (x, y) directions takes following form:

$$\frac{\partial}{\partial t}\begin{pmatrix} p \\ p_{dot} \end{pmatrix} = \begin{pmatrix} -\mu_{xy} & 1 \\ v^2\left(\frac{\partial^2}{\partial x^2} + \frac{\partial^2}{\partial y^2} + \frac{\partial^2}{\partial z}\right) & -\mu_{xy} \end{pmatrix}\begin{pmatrix} p \\ p_{dot} \end{pmatrix}$$

Combining of z—PML and (x, y)—ABC, and after some reformulations, yields $$\frac{\partial}{\partial t}\begin{pmatrix} p \\ p_{dot} \end{pmatrix} = \begin{pmatrix} -\mu_{xy} & 1 \\ v^2\left(\hat{\gamma}_z\left(\frac{\partial^2}{\partial x^2} + \frac{\partial^2}{\partial y^2}\right) + \frac{\partial}{\partial z}\frac{1}{\hat{\gamma}_z}\frac{\partial}{\partial z}\right) & -\mu_{xy} - \mu_z \end{pmatrix}\begin{pmatrix} p \\ p_{dot} \end{pmatrix}$$

In the slightly more general constant-density VTI case, combined equations of z—PML and (x, y)—ABC can be written using wave equation terms involving horizontal spatial derivatives denoted by p and terms involving vertical spatial derivatives denoted by q as $$\frac{\partial}{\partial t}\begin{pmatrix} p \\ q \\ p_{dot} \\ q_{dot} \end{pmatrix} =$$

$$\begin{pmatrix} -\mu_{xy} & 0 & 1 & 0 \\ 0 & -\mu_{xy} & 0 & 1 \\ \frac{C_{11}}{\rho}\hat{\gamma}_z\left(\frac{\partial^2}{\partial x^2} + \frac{\partial^2}{\partial y^2}\right) & \frac{C_{13}}{\rho}\frac{\partial}{\partial z}\frac{1}{\hat{\gamma}_z}\frac{\partial}{\partial z} & -\mu_{xy} - \mu_z & 0 \\ \frac{C_{13}}{\rho}\hat{\gamma}_z\left(\frac{\partial^2}{\partial x^2} + \frac{\partial^2}{\partial y^2}\right) & \frac{C_{33}}{\rho}\frac{\partial}{\partial z}\frac{1}{\hat{\gamma}_z}\frac{\partial}{\partial z} & 0 & -\mu_{xy} - \mu_z \end{pmatrix}\begin{pmatrix} p \\ q \\ p_{dot} \\ q_{dot} \end{pmatrix}$$

where $$\frac{\partial}{\partial t}p = p_{dot},$$

and $$\frac{\partial}{\partial t}q = q_{dot}.$$

The Voigt stiffness coefficients are denoted by $C_{11}$, $C_{13}$ and $C_{33}$, and the density is denoted by $\rho$.

It may be noted that the functions $\mu_z$ for z—PML and $\mu_{x,y}$ might be chosen differently. The more general orthorhombic case might be implemented similarly.

Test Examples

Figure 2:
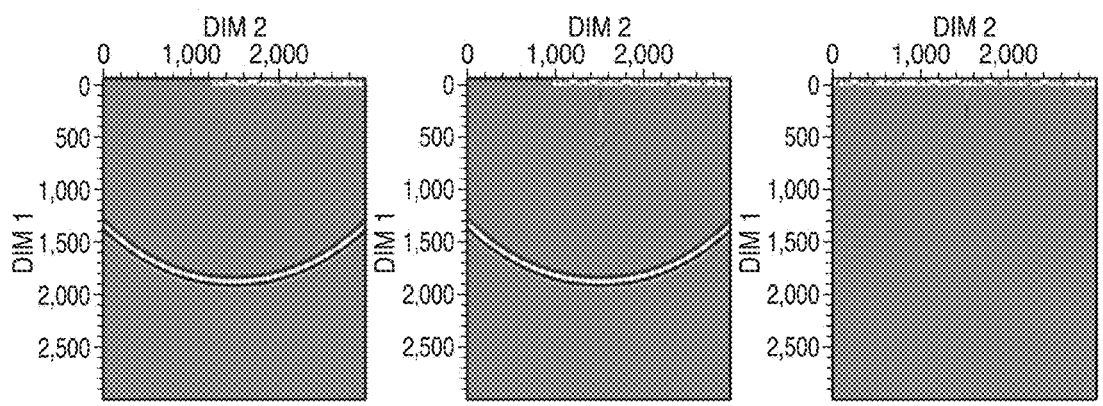
FIG. 2 shows the same comparison as in FIG. 1, but with low (normal) saturation images.
Figure 3:
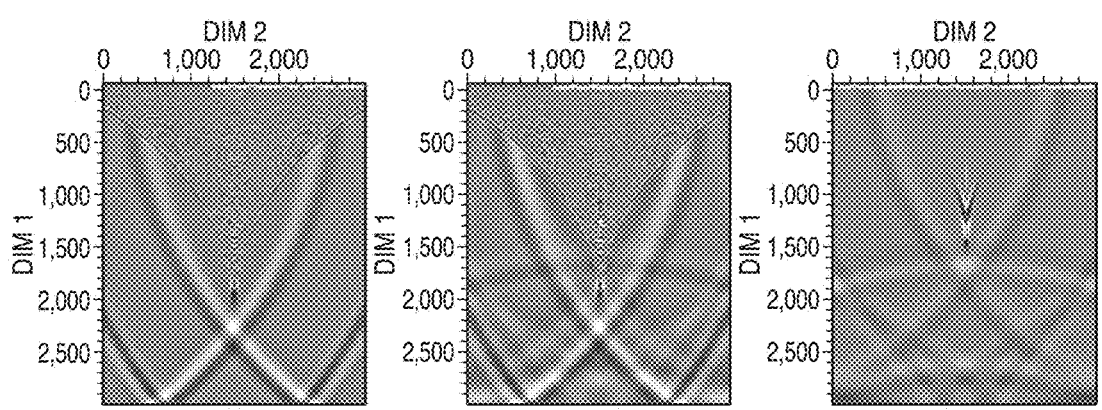
FIG. 3 shows that PML on the bottom of the model helps to get rid of low frequency artifact from the ABC side reflections after tapering the dip on the top and bottom of the model toward the vertical direction.

A test exercise was carried out using synthetic seismic data to compare the present inventive method (z—PML, (x,y)—ABC) with a conventional approach of using ABC on all boundary surfaces. For the comparison studies, 12 boundary layers were used for the PML and 24 boundary layers were used for the ABC. For the FIGS. 1-3, the following model was used: A homogeneous VTI medium (no reflecting interfaces), with a source placed in the top/middle of the model. Thus, all reflections shown in these data displays are nonphysical artifacts except for the diamond-shaped wave front of the pseudo-shear wave. In FIGS. 1-3, the image generated using the present inventive method is shown on the left, the image using all ABC is shown in the middle, and the difference is shown on the right. FIGS. 1-3 show data that were computer-simulated, using the aforementioned assumed velocity model. The direct wave that is being simulated 11 appears prominently and identically in both the left and middle panels of FIGS. 1 and 2. FIGS. 1 and 2 are the same display, shown at different saturations; i.e. the contrast is turned up higher (by a factor of 100) in FIG. 1 than in the normal display of FIG. 2. It may be noted that the present inventive method (left) eliminates the reflections 13 from the top, even at the high saturation of FIG. 1. The side reflections 12 are naturally the same in both the left and middle displays since both use the same ABC boundary conditions. The difference display (right) is artifact that is present when using all ABC, but is removed when using the boundary conditions of the present invention. The horizontal and vertical axes on the drawings indicate subsurface position in meters.

In FIG. 1, a source is placed near the center of the top boundary in a medium with no internal reflecting boundaries. A snapshot of waves propagating in the medium is shown. In the left picture, the top and bottom external boundaries are implemented with PML while the side external boundaries are implemented via ABC where low-frequency reflections 12 from the ABC side boundaries are visible. The reflection from the top boundary has such low amplitude that it is not visible. All external boundaries for the same medium are implemented via ABC in the middle picture, where low-frequency reflections 12 are visible from the side boundaries, and now there is a visible reflection 13 from the top boundary. One may also observe a double-bounce event that reflects first from the top boundary and then from a side boundary. The difference between the left and middle wave fields is shown on the right. These are high saturation images so the differences appear to be very large.

In FIG. 1, the images are highly saturated. Any reflections from the top/bottom surfaces could add up and produce an image artifact. Therefore, perfect absorption from the top/bottom surfaces is always important. As stated above, FIG. 1 demonstrates that reflection from the top when using PML on the top (present invention—left) is invisible even in the highly saturated plot. The ABC sides have stronger reflections, but this is acceptable because they are not coherent with each other and would be stacked in a final image. (The drawings show pre-stack data.) The side reflections will end up in the different places for different shots, which is why they will cancel when the shots are stacked (summed).

FIG. 2 shows the same information as in FIG. 1, but in a normal display, i.e. at lower saturation. The top reflections 13 are not apparent in the middle panel at normal saturation. However, they are not incoherent like the side reflections, and could add up when the data are stacked and produce an image artifact.

FIG. 3 is a snapshot of the simulation and a much later propagation time than for FIGS. 1 and 2. It is after the direct wave 11 has passed through the bottom boundary of the computational domain. Ideally, it should pass through this boundary with no reflections, but in this high saturation display, small external boundary reflection events can be seen. Low-pass frequency filtering has been done, giving a low-frequency, later in time, view of the same simulation as FIGS. 1 and 2. FIG. 3 shows that the ABC radiation conditions mitigate the boundary reflections poorly for low-frequency events. The PML boundary conditions do a much better job of mitigating the reflection of low-frequency energy from the external boundary. For RTM and FWI applications, the wave fields that propagate primarily in the horizontal directions do not impact imaging and inversion results. On the other hand, waves that reflect from the bottom boundary and propagate upwards towards the receiver locations do have a detrimental impact on RTM and FWI applications. FIG. 3 demonstrates another advantage of the present invention. After tapering the dip on the top and bottom of the model to the vertical direction, low frequency reflections from the sides of the model will be absorbed by the bottom PML layer and consequently not contribute to the image artifact.

Figure 4:
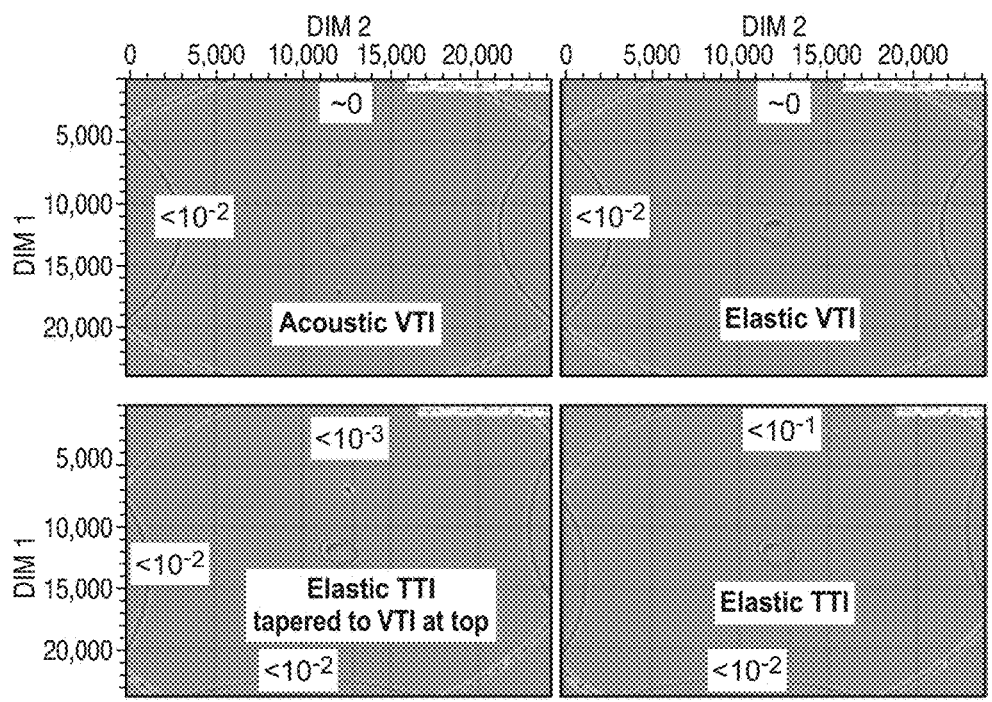
FIG. 4 shows the relative performance of PML and ABC boundaries for acoustic media (upper left), elastic media with no tilt (upper right), elastic media with tilt tapered (lower left), and elastic media with tilt without tapering (lower right)

FIG. 4 is included to show the relative performance of PML boundary conditions and ABC boundary conditions. This is done for four different velocity models: acoustic media (upper left), elastic media with no tilt (upper right), elastic media with tilt tapered (lower left), and elastic media with tilt without tapering (lower right). In every case, the top and bottom boundary conditions are PML and the side boundaries are ABC. The source location for the computer simulation is shown at the center of each panel. Because the source is symmetric, comparison of the top/bottom reflections to the side reflections indicates the relative performance of PML and ABC boundary conditions. The simulation algorithm used treats derivatives to the second-order in the finite difference approximation. The numbers such as ~0 or 10-2 indicate the amplitude of the reflection artifacts from the top surface, the bottom surface, or a side surface, depending on where the number is located, with all amplitudes scaled or normalized such that the maximum amplitude of the desired simulated wave (not shown) is unity. It may be noted that for an elastic medium with a tilted anisotropy axis of symmetry, tapering the tilt reduces the top surface reflection artifact by a factor of 10. In the upper two panels of FIG. 4, it can be seen that the side reflections appear at the same height, and therefore will not cancel on stacking. In the lower two panels, the side reflections appear at different heights, and will cancel with stacking.

The foregoing description is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined by the appended claims.

REFERENCES

1. Bechache, Eliane, Sandrine Fauqueux, and Patrick Joly, 2001, "Stability of Perfectly Matched Layers, Group Velocities and Anisotropic Waves", *INRIA Rocquencourt*, ISSN 0249-6399, ISRN INRIA/RR-4304-FR+ENG.
2. Berenger, J., "A perfectly matched layer for the absorption of electromagnetic waves," *Journal of Computational Physics* 114, 185-200 (1994); doi:10.1006/jcph.1994.1159.
3. Komatitsch, D., and Martin, R., 2007, "An unsplit convolutional perfectly matched layer improved at grazing incidence for the seismic wave equation", *Geophysics*, 72(5), SM155-SM167
4. Loh, P. R., A. F. Oskooi, M. Ibanescu, M. Skorobogatiy, and S. G. Johnson, "Fundamental relation between phase and group velocity, and application to the failure of perfectly matched layers in backward-wave structures," *Phys. Rev. E*, vol. 79, p. 065601(R), 2009.
5. Marcinkovich, C., K. Olsen, "On the implementation of perfectly matched layers in a three-dimensional fourth-order velocity-stress finite difference scheme," *Journal of Geophysical Research Solid Earth* 108, 2276-2291 (2003).
6. Oskooi, Ardavan, and Steven G. Johnson, "Distinguishing correct from incorrect PML proposals and a corrected unsplit PML for anisotropic, dispersive media", *Journal of Computational Physics* 230 (2011) 2369-2377.B
7. Kenneth Duru, Gunnila Kreiss, "A well-posed and discretely stable perfectly matched layer for elastic wave equations in second order formulations", *Commun. Comput. Phys*. Vol. 11, NO. 5, pp. 1643-1672 (2012).
8. Kosloff, R., Kosloff, D., "Absorbing boundaries for wave propagation problems", *Journal of Computational Physics*, Vol. 63, pp. 363-376 (1986).
9. Dmitriev M. N., Lisitsa V. V. "Application of M-PML reflectionless boundary conditions to the Numerical Simulation of Wave propagation in anisotropic media. Part 1: Reflectivity" *Numerical analysis and Applications*, 2011, vol 4, pp. 271-280.
10. Wei Zhang and Yang Shen, "Unsplit complex frequency-shifted PML implementation using auxiliary differential equations for seismic wave modeling", *Geophysics*, Vol. 75, pp. S141-154 (2010).

All references are incorporated herein in all jurisdictions that allow it.

The invention claimed is:
1. A method for exploring for hydrocarbons in a subsurface region, comprising:
  simulating a seismic waveform, using a computer and a model of subsurface velocity or other physical property affecting propagation of seismic waves in the subsurface region, wherein computations are performed on a finite computational grid representing a subsurface region, said finite computational grid using absorbing condition boundary conditions to minimize non-physical wave reflections at grid boundaries, said absorbing condition boundary conditions being PML boundary conditions for top surface of the finite computational grid, and ABC boundary conditions for side surfaces of the finite computational grid;
  using the simulated waveform in performing full waveform inversion or reverse time migration of seismic data;
  displaying (i) an inferred physical property model from the inversion or (ii) a subsurface image from the migration; and
  using the (i) inferred physical property model or (ii) the subsurface image to prospect for hydrocarbons in the subsurface region.

2. The method of claim 1, wherein the PML boundary conditions are 1D PML.

3. The method of claim 2, wherein said model of subsurface velocity or other physical property affecting propagation of seismic waves is anisotropic with an axis of symmetry tilted from vertical, and further comprising padding the finite computational grid at the top or bottom surface, or both, to taper the axis of symmetry at said top or bottom surfaces toward vertical.

4. The method of claim 1, wherein a plurality of absorbing layers is used on the top and bottom surfaces or the side surfaces or both.

5. The method of claim 1, further comprising applying ABC or PML boundary conditions to a bottom surface of the finite computational grid.

6. The method of claim 1, wherein an orthorhombic subsurface medium is assumed for PML implementation at the top surface and, if PML is used at a bottom surface of the finite computational grid, an orthorhombic medium is assumed there as well.

7. The method of claim 1, further comprising jointly using z—PML and x,y—ABC boundary conditions at corners of the finite computational grid.

8. The method of claim 1, wherein said model of subsurface velocity or other physical property affecting propagation of seismic waves is assumed to be isotropic in a zone at the top surface, or at a bottom surface of the finite computational grid, or both.

9. The method of claim 1, wherein said model of subsurface velocity or other physical property affecting propagation of seismic waves is anisotropic with transversely isotropic or orthorhombic symmetry in a zone at the top surface, or at a bottom surface of the finite computational grid, or both.

* * * * *